Patented Mar. 7, 1939

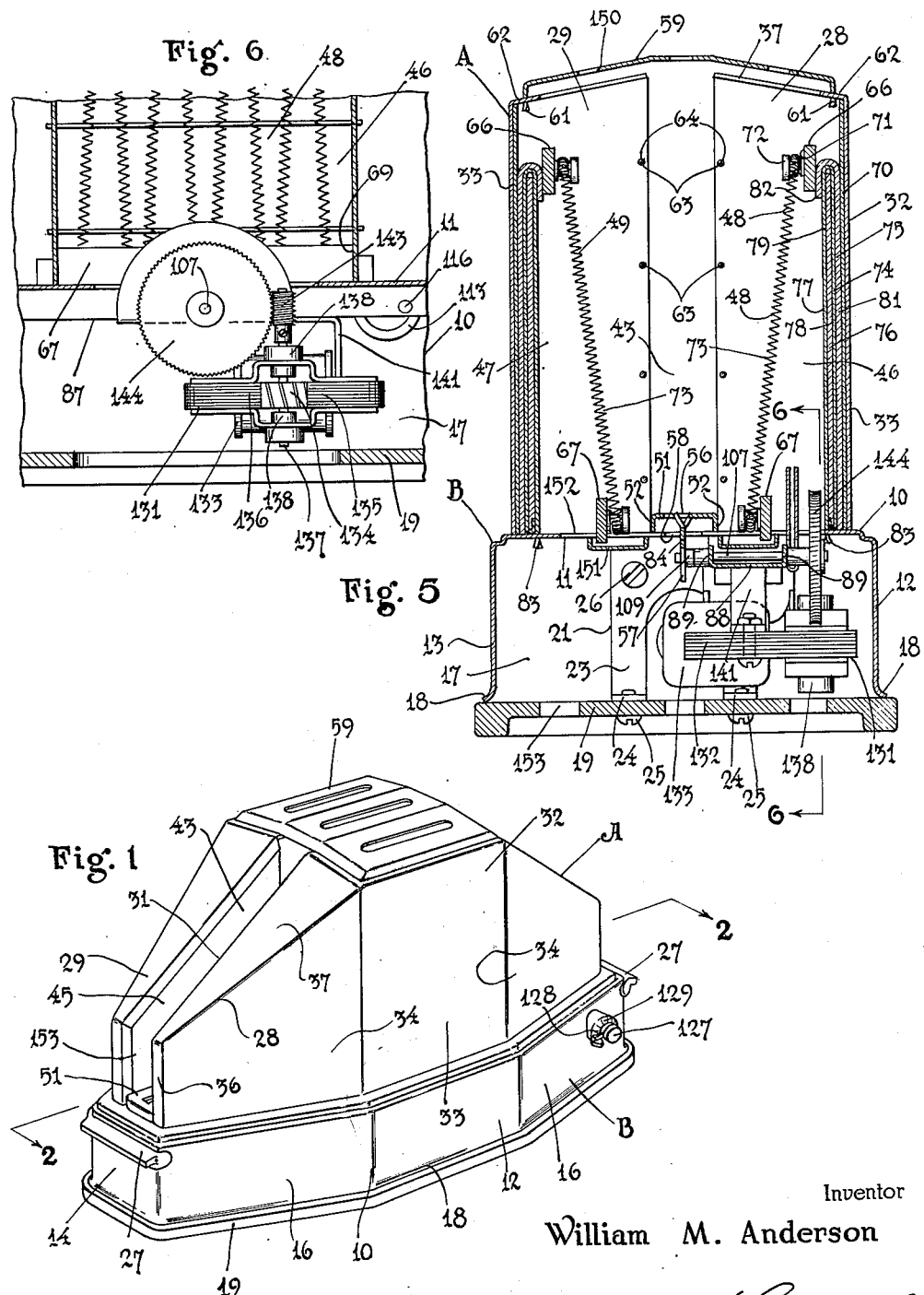

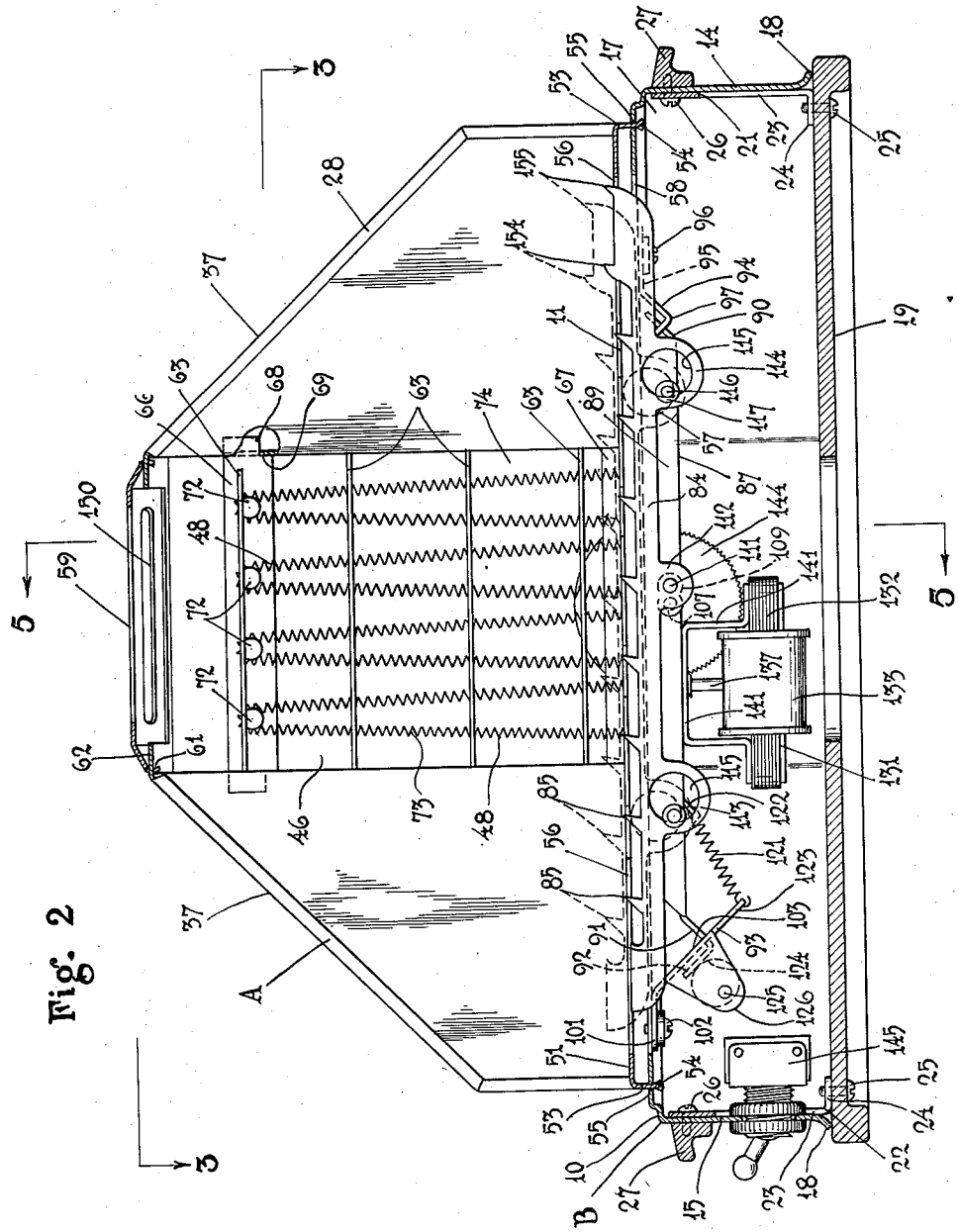

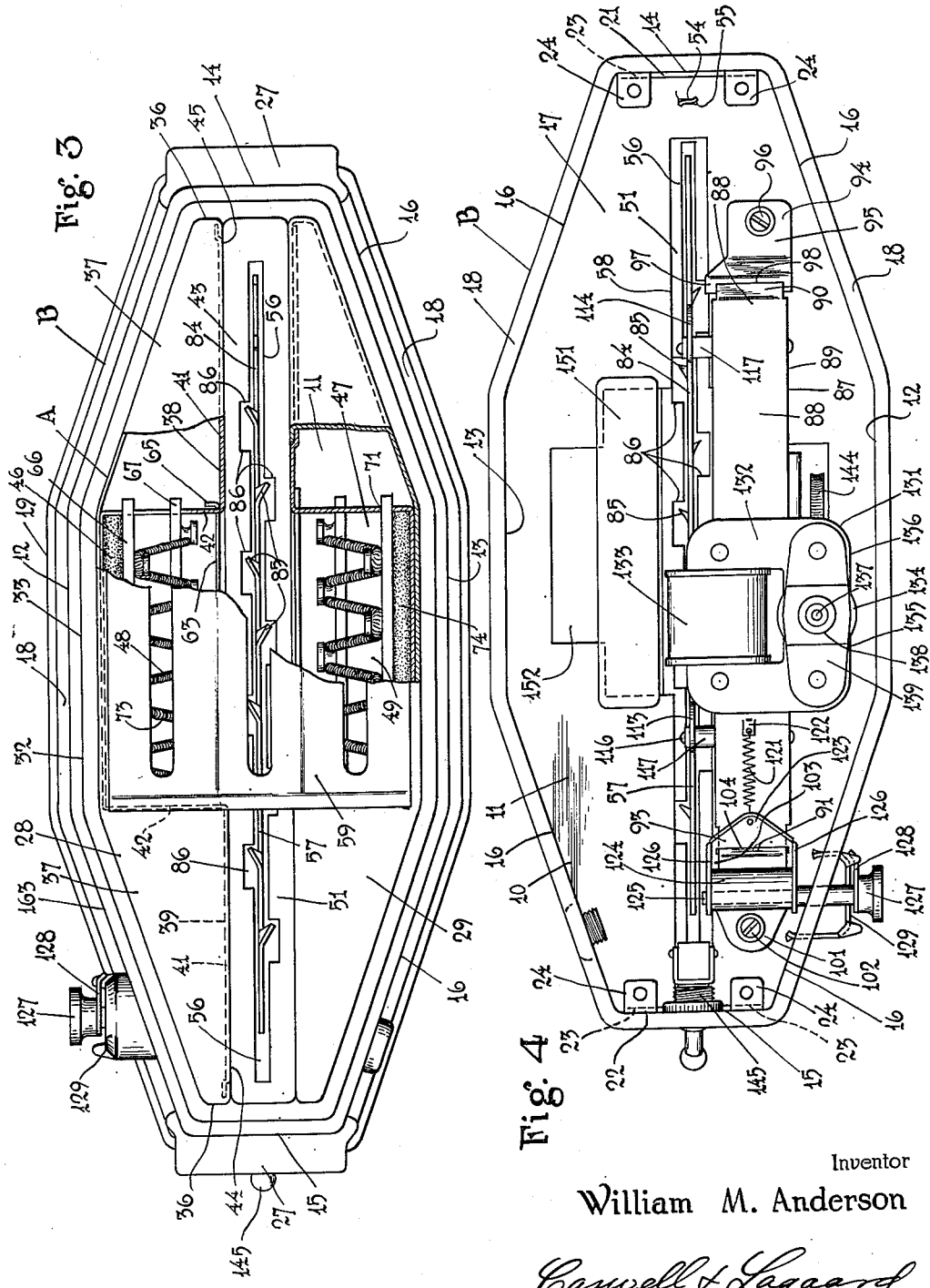

2,149,566

UNITED STATES PATENT OFFICE 2,149,566

TOASTER

William M. Anderson, Minneapolis, Minn., assignor to Kerner and Anderson, Minneapolis, Minn., consisting of Frank J. Kerner and William M. Anderson, both of Minneapolis, Minn., a copartnership Application May 10, 1935, Serial No. 20,828

11 Claims. (Cl. 219—19)

My invention relates to bread toasters and has for an object to provide a bread toaster in which the operation of toasting is continuous.

An object of the invention resides in providing a toaster in which the bread is inserted in one end of the toaster and is discharged from the other end properly toasted.

A still further object of the invention resides in providing a toaster in which the bread travels on edge and is toasted while in an upright position.

Another object of the invention resides in providing a toaster in which variations in degree of toasting is procured without changing the speed of travel of any of the moving parts of the toaster and without adjustment of the heater.

A feature of the invention resides in providing a toaster in which the toasting is carried on progressively from one end of the toast to the other.

Another object of the invention resides in providing a toaster in which the bread travels during toasting past the heater.

An object of the invention resides in providing a way along which the bread to be toasted travels on edge, said way having a slot therethrough and in further providing a support and a feed bar carried thereby and having a number of dogs thereon adapted to extend through the slot and to engage the bread and to progress the bread along the way.

Another object of the invention resides in giving said feed bar a circular parallel motion whereby the dogs are first moved upwardly into the slot to engage the bread, thereafter moved longitudinally along the slot to progress the bread along the same, next moved downwardly outwardly out of the slot and thereafter moved back to original position beneath the slot.

A still further object of the invention resides in adjusting the position of the support for said feed bar relative to said way to vary the arc of movement of the dogs along said slot and the rate of travel of the bread through the toaster without changing the speed of operation of the feed bar.

An object of the invention resides in providing a frame by means of which the way on which the bread travels is supported and in further providing an auxiliary frame for supporting the feed mechanism.

A still further object of the invention resides in providing guide means for guiding said auxiliary frame for movement toward and from the first named frame.

A feature of the invention resides in utilizing an electric motor for operating said feed bar and in mounting said electric motor upon said auxiliary frame.

Another feature of the invention resides in the specific construction of the feed bar and in the specific mechanism for giving the said feed bar its circular parallel motion.

An object of the invention resides in the specific mechanism for guiding and moving the auxiliary frame with reference to the first mentioned frame.

Other objects of the invention reside in the novel combination and arrangement of parts and in the details of construction hereinafter illustrated and/or described.

In the drawings:

Fig. 1 is a perspective view of a toaster illustrating an embodiment of my invention.

Fig. 2 is an elevational sectional view taken on line 2—2 of Fig. 1.

Fig. 3 is a plan sectional view taken on line 3—3 of Fig. 2.

Fig. 4 is an inverted plan view of the structure shown in Fig. 1 with the bottom plate removed.

Fig. 5 is a cross sectional view taken on line 5—5 of Fig. 2.

Fig. 6 is a fragmentary elevational sectional view taken on line 6—6 of Fig. 5.

In the toasting of bread it becomes highly desirable to terminate the toasting operation after the toast has been properly toasted. This has been previously accomplished by shutting off the electric current or by partly removing the toast from the toasting chamber after the toasting has been completed. In such devices one slice at a time is toasted in each unit, the slice remaining stationary with respect to the heater during toasting. Both of these methods are disadvantageous in that considerable time is lost. The present invention provides a toaster in which the operation is continuous and in which the bread may be inserted into the toaster at one end and comes out at the other end of the toaster properly toasted and in which successive slices of bread may be placed in the toaster before the preceding slice is completely toasted so that several slices are passing through the device at one time.

My improved toaster comprises primarily two parts, a case A through which the bread passes in being toasted and a base B which is hollow and provided with a compartment in which all of the operating mechanism of the invention is disposed. These parts will now be described in detail.

The base B is preferably constructed of sheet metal which is stamped into the form illustrated and constitutes a frame which I have indicated by the reference numeral 10 to which the remainder of the toaster is attached. The base B comprises a top 11, side walls 12 and 13 and end walls 14 and 15 depending therefrom and being open at the bottom. The side walls 12 and 13 converge as indicated at 16 making the base in the shape of an elongated octagon. By means of this construction a compartment 17 is formed within the interior of the base B in which is mounted all of the operating mechanism of the invention.

Along the lower marginal edge of the base B is formed an outwardly extending flange 18 which serves to stiffen the entire construction and forms a rest on which the base is supported. The compartment 17 is closed by means of a bottom plate 19 which may be constructed of a phenol formaldehyde product or any other heat insulating material which is preferably not metallic. This bottom plate is attached to the base B by means of two metal stampings 21 and 22 which are secured to the end walls 14 and 15 of said base. These stampings are constructed with legs 23 which extend downwardly therefrom, said legs having feet 24 issuing outwardly at right angles thereto. A number of screws 25 extend through the bottom 19 and are threaded into the feet 24. The stampings 21 and 22 are attached to the walls 14 and 15 by means of screws 26 which extend through said stampings and said end walls and which are threaded into handles 27 mounted upon the exterior of the base and by means of which the entire toaster may be readily carried about. These handles are also constructed of heat insulating material similar to that used for the bottom 19.

The case A is constructed in two sections indicated by the reference numerals 28 and 29 which are spaced apart as shown in Figs. 1 and 5 to provide a narrow vertical passageway 43 therebetween. Both of the sections 28 and 29 being identical in construction, only the section 28 will be described in detail. The section 28 of case A consists of an outer shell 32 constructed of sheet metal which is bent to form a vertical wall 33 parallel with the wall 12 of base B, said wall being bent to form portions 34 parallel with the portion 16 of said base. The extreme ends of the shell 32 are bent inwardly at right angles as designated at 36, the said parts being parallel to the walls 14 and 15 of the base B. The portions 34 and 35 have bent outwardly therefrom inclined top walls 37.

Within the interior of the section 28 are provided two angle shaped vertical partitions 38 and 39. These partitions have walls 41 lying in the same medial plane and engaging the edges of the parts 36 and also have walls 42 extending at right angles therefrom and engaging the portion 33 of the shell 32. By means of the various partitions 38 and 39 of both sections 28 and 29 the passageway 43 is formed which extends throughout the length of the toaster and which is open at its ends indicated at 44 and 45. The walls 42 of the partition 39 form compartments 46 and 47 within the base B in which suitable heaters 48 and 49 are placed. The bread to be toasted passes longitudinally through the passageway 43 and the heaters 48 and 49 serve to toast the bread as the same passes through the toaster. The partitions 38 and 39 are preferably constructed of aluminum or some other heat conducting metal. These partitions being in heat conducting relation with respect to the heaters 48 and 49 cause the bread to be heated at all times during the passage of the bread through the toaster. The two sections 28 and 29 are connected together by means of a cover plate 59 which is attached to the top walls 37 of the shells 32. These parts are preferably formed with ears 61 which extend through flanges 62 on said top walls and which are bent over as shown in Fig. 2.

For the purpose of supporting the bread while the same is passing through the passageway 43, a way 51 is employed which is constructed of sheet metal and which rests upon the top 11. This way is formed with flanges 52 turned downwardly from the sides thereof and with flanges 53 turned downwardly from the ends thereof. The flanges 53 have lugs 54 formed thereon which extend through openings 55 in the top 11. These lugs may be bent as shown in Fig. 2 to hold the way securely attached to said top. The way 51 is formed throughout the major portion of its extent with a longitudinally extending slot 56 through which projects certain parts of a feed mechanism which is indicated in its entirety by the reference numeral 57. Top 11 is constructed with a similar slot 58 serving the same purpose as the slot 56.

The toast in its passage through the passageway 43 slides along the way 51 resting upon its lowermost edge. During such movement the bread is held in erect position by the walls 41 of the partitions 38 and 39, which serve as guides for the same. In between these walls are provided guide rods 63 which form a continuation of the walls 41 and which do not interfere with the passage of heat from the heaters 48 and 49 to the bread. These rods extend through openings 64 in the walls 42 of the partitions 38 and 39 and have their ends bent over as indicated at 65 in Fig. 3 to hold the said rods attached to the said partitions.

The two heaters 48 and 49 being identical in construction, only the heater 48 will be described in detail. This heater includes two bars 66 and 67 of insulating material which extend across the two walls 42 of the partitions 38 and 39. The extreme ends of these bars 68 are reduced in width to form shoulders 69 adjacent the same. These ends extend through suitable openings 71 in the walls 42 and the shoulders 69 abut against said walls and hold the bars in proper position. Issuing outwardly from said bars are insulating pegs 72 which are spaced from one another. The heater further comprises a heating element 73 constructed of resistance wire coiled to provide spaced convolutions. This heating element is alternately strung from the pegs 72 of the bar 66 to the corresponding pegs of bar 67 as clearly shown in Fig. 2 and the ends securely attached to the lowermost bar 67. By means of suitable conductors connected to the ends of the heating element 73 electricity may be conducted to the same whereby heat is produced in the compartment 46 in which the heating element is disposed. It will be noted that the heating elements 73 are arranged in inclined manner as shown in Fig. 5. This is for the purpose of producing an even heat throughout the height of the slice of bread. Were the heating elements arranged vertically, the temperature in the upper portion of the toaster would be greater than in the lower portion and uneven toasting would result.

For the purpose of retaining the heat within the compartments 46 and 47 an insulating pad 74 is placed in back of each of the heaters 48 and 49. This insulating pad consists of a sheet of asbestos 75 which has a portion 76 thereof disposed between two folded over parts 77 and 78 of a metal shield 79. The said sheet of asbestos has another portion 81 which overlies the portion 78 of shield 79. The extreme end of the sheet of asbestos is turned over as indicated at 82 to overlie the upper end of the part 77 of said shield. The pad 74 is held in position at its upper end between the insulating bar 66 and the outer wall of the case 32 and at its lower end by means of lugs 83 which extend through suitable openings in the top 11 of base B, not shown in the drawings.

The feed mechanism 57 is mounted upon and carried by an auxiliary frame 87. This frame is in the shape of a channel having a web portion 88 and flanges 89 extending upwardly therefrom. The extreme ends of the flanges 89 are cut away and the web 88 of said frame is bent upwardly at one end to form an inclined tongue 90. The other end of the frame is similarly constructed, the flanges thereof being cut away and the web being bent downwardly to form a second inclined tongue 91. This tongue is formed at its extreme end with an abutment 92 disposed at right angles thereto and formed by bending said tongue 91. The entire frame 87 is guided for sliding movement toward and from the top 11 of base B by means of the two tongues 90 and 91 which slide in suitable guides 93 and 94. Guide 94 is provided with a base portion 95 which is secured to the under surface of top 11 of base B by means of a screw 96. This guide is further constructed to provide a part 97 inclined at right angles to the tongue 90 and formed with a slot 98 best shown in Fig. 4 through which the tongue 90 extends. The guide 93 is similarly constructed with a base portion 101 which is secured to the under surface of top 11 of base B by means of a screw 102 and is formed with an inclined portion 103 constructed with a slot 104 through which the tongue 91 extends. By means of these tongues and guides, the frame 87 is slidably mounted for parallel movement toward and from the top 11 of base 12.

The feed mechanism 57 of the invention comprises a feed bar 84 which is constructed from sheet metal and which is stamped to form a number of dogs 85 extending upwardly therefrom. These dogs are preferably shaped similar to saw teeth and are formed with a set similar to the teeth of the saw, said dogs being bent alternately outwardly from the plane of the bar as best shown in Fig. 3. To accommodate these dogs, notches 86 are formed in the way 51, which notches communicate with the slot 56 therein.

For operating the feed mechanism 57 a crank shaft 107 is employed which is journaled in two bearings formed in the flanges 89 of the frame 87 by drilling holes through the same. This crank shaft is provided at one end with a crank 109 which has attached to it a crank pin 111. Crank pin 111 passes through and is journaled in an ear 112 on the feed bar 84. The feed bar is supported at its ends in the following manner: Intermediate the ends of the feed bar 84 are formed lugs 113 and 114 which have circular holes 115 extending through the same. Extending across the flanges 89 of the frame 87 are two guide rods 116 which are provided with slotted bushings 117, which receive the marginal portions of the lugs 113 and 114 at the holes 115. These lugs and said guide rods serve to guide the feed bar 84 so that the same has a circular parallel movement when the shaft 107 is rotated. Through this action each of the dogs 85 travels in a circle having a diameter equal to the throw of the crank 109, said dogs remaining upright throughout such movement. The frame 87 is so positioned that when the crank shaft 107 is rotated the dogs 85 travel upwardly and into slot 56, raising the bread above the way 51. At the same time the said dogs travel forwardly to advance the bread along the said way. The dogs thereafter travel downwardly and out of the slot 56 depositing the bread back upon the way. Thereafter the dogs travel beneath the way 51 so that the same arrive at their original positions where they are ready to enter the slot and repeat the cycle. It will readily be comprehended that the bread is thus given a step by step movement and advanced along the passageway 43.

For the purpose of assisting in the discharge of the bread from the toaster, two ejector prongs 154 and 155 are formed on the feed bar 84 at the extreme end thereof, which prongs are similar to the feed dogs 85 excepting that the same are disposed at a higher elevation than said feed dogs. These prongs serve to engage the bread regardless of the position of the feed bar with respect to the slot 56 and causes the ejection of the bread for all settings of the frame 87.

Due to the fact that the feed dogs have a circular course of motion, the length of travel of the same along the slot 56 may be adjusted by raising and lowering the frame 87 with respect to the top 11 of base B. This has the effect of varying the degree that the said dogs enter said slot and correspondingly varying the length of travel of the dogs along the slot. For this reason the frame 87 is slidably mounted through the tongues 90 and 91 in the guides 93 and 94. The said frame 87 is normally held in its lowermost position by means of a coil spring 121 which is secured at one end to an ear 122 struck out of the web 88 of frame 87. This spring is secured at its other end to an extension 123 formed on the inclined portion 103 of guide 93. The frame 87 may be urged upwardly in opposition to the spring 121 through the action of a cam 124. This cam is mounted upon a shaft 125 which is journaled in two bearings 126 formed on the guide 93. Shaft 125 extends outwardly through the portion 16 of base B and has attached to its outer end a knob 127 by means of which the same may be manipulated. Said shaft has further secured to it a pointer 128 which is movable along a scale 129 secured to the base B. By adjusting the knob 127 the time required for the bread to travel through the toaster can be regulated and any degree of toasting can be secured.

Shaft 107 is driven in the following manner: For the purpose an electric motor 131 is employed which may be of the shaded pole single phase alternating current type. This motor is constructed with a field core 132 having a field coil 133 encircling the same. An armature 134 rotates between the pole pieces 135 and 136 of the core 132. This armature is provided with an armature shaft 137 which is journaled in bearings 138 secured to brackets 139 attached to the core 132. The entire motor is supported by means of a bracket 141, which bracket is attached to the field core 132 and also to the web 88 of the auxiliary frame 87. The motor 131 is thus carried by the auxiliary frame and is fixed with respect thereto.

The armature shaft 137 of motor 131 extends upwardly therefrom as shown in Fig. 6 and has attached to its upper end a worm 143. This worm meshes with a worm wheel 144 attached to the end of the crank shaft 107. As the armature of the motor rotates crank 109 is rotated and the feed mechanism 57 operated. Motor 131 being of the shaded coil type runs at a substantially uniform rate of speed. For this reason any setting of the shaft 125 will procure the same degree of toasting when the toaster is operated.

For the purpose of shutting off the supply of current to the toaster, an electric switch 145 is employed which is attached to the base B. This switch is connected to the motor and heating elements of the toaster in the customary manner. Such means forming no particular feature of the invention have not been shown in the drawings, though it can readily be comprehended that the motor and heating elements may be connected in parallel and operated by the same switch.

For the purpose of preventing overheating and for the circulation of air through the device, openings 150 are formed in the cover plate 59 and openings 153 in the bottom plate 19. Similar openings 152 are arranged in the top 11 of base B. These latter openings have pans 151 disposed below the same which catch the crumbs from the bread and prevent the same from falling into the movable part of the mechanism of the invention.

The use of my invention is as follows: Switch 145 is first turned on. This causes the current to pass through the two heaters 48 and 49. As soon as these heaters have heated up the interior of the toaster and particularly the structure forming compartments 46 and 47, switch 151 closes and the circuit controlling the motor 131 is energized. The motor then rotates and turns the gear 144 which drives shaft 137 and the crank 109 connected thereto. This gives the feed bar 84 a circular parallel movement causing the feed dogs 85 to travel up into the slot 56 along said slot down and away from said slot and back beneath the slot to original position. This movement is continuous. At any time bread may be inserted into the passageway 43 at the inlet end thereof which is designated by the reference numeral 153. As soon as the motor 131 is energized the feed dogs 85 engage the bread and give it a step by step movement along the way 51 causing the bread to travel through the passageway 43. As the bread passes the two heaters 48 and 49 the same is toasted. When the bread has been completely toasted, the same is ejected from the device at the opposite end of the passageway 43 and is discharged upon the table on which the device rests. If it be desired to change the degree of toasting of the bread, the same may be accomplished by rotating knob 127. This raises or lowers the auxiliary frame 87 relative to the base B which varies the length of movement of the various feed dogs 85 along the way 51 and increases or decreases the length of movement of the bread during each cycle of operation of the feed dogs. It is to be noted, that the period of time required for each cycle of movement of the said dogs is not altered. However, the length of travel of the feed dogs is changed by adjusting knob 127 so that the desired result is procured without changing the speed of the motor or the transmission. In this manner the bread can be toasted to any desired degree. In the insertion of the bread into the toaster, any number of slices may be successively placed in the toaster adjacent one another. It is, therefore, possible to have three slices passing through the toaster at one time which increases the capacity of the toaster and reduces the length of time required to toast the bread. Due to the fact that the bread travels both vertically and horizontally with respect to the heating element and to the supporting means between the heating element and the bread, no marks due to uneven toasting are present on the toast when it leaves the toaster.

My invention is highly advantageous in that it prevents bread from burning during the toasting thereof. With my invention the bread is fed into the device and automatically ejected therefrom when properly toasted, thus permitting the person using the device to occupy himself with other activities after the bread has been inserted. The bread is positively fed through the toaster and is carried through it on edge insuring uniform toasting on both sides of the bread. When the toasting is completed, the bread is completely discharged from the toaster. My invention is exceedingly compact and may be constructed neat and attractive in appearance. My invention is simple in construction and is positive in action, being entirely foolproof.

Changes in the specific form of my invention, as herein disclosed, may be made within the scope of what is claimed without departing from the spirit of my invention.

Having described my invention, what I claim as new and desire to protect by Letters Patent is:

1. In a bread toaster, a frame, means carried by said frame and forming a narrow vertical passageway open at its ends, said means including a way upon which the bread travels on edge, said way having a slot therein, an auxiliary frame, a feed mechanism carried by said auxiliary frame and including a feed bar having dogs thereon adapted to extend through the slot and to engage the bread on said way, means for giving the feed bar a circular parallel motion to cause the dogs to move through the slot, toward the bread, and into the passageway, lengthwise within the passageway, through the slot out of the passageway and away from the bread and back to original position below the slot, means for moving said auxiliary frame toward and from said first named frame to vary the length of the movement of the dogs within said passageway, and means for toasting the bread during its passage through the passageway.

2. In a bread toaster, a frame, means carried by said frame and forming a narrow vertical passageway open at its ends, said means including a way upon which the bread travels on edge, said way having a slot therein, an auxiliary frame, a feed mechanism carried by said auxiliary frame and including a feed bar having dogs thereon adapted to extend through the slot and to engage the bread on said way, means carried by the auxiliary frame for giving the feed bar a circular parallel motion to cause the dogs to move through the slot toward the bread, and into the passageway, lengthwise within the passageway, through the slot out of the passageway and away from the bread and back to original position beneath the slot, means for moving said auxiliary frame toward and from the first named frame to vary the length of travel of the dogs within said passageway, and means for toasting the bread during its passage through the passageway.

3. In a bread toaster, a frame, means carried by said frame and forming a narrow vertical passageway open at its ends, said means including a way upon which the bread travels on edge, said way having a slot therein, an auxiliary frame, a feed mechanism carried by said auxiliary frame and including a feed bar having dogs thereon adapted to extend through the slot and to engage the bread on said way, means for giving the feed bar a circular parallel motion to cause the dogs to move through the slot, toward the bread, and into the passageway, lengthwise within the passageway, through the slot out of the passageway and away from the bread and back to original position below the slot, means for guiding said auxiliary frame for parallel movement in a direction toward and from the first named frame to vary the length of travel of the dogs within said passageway, and means for toasting the bread during its passage through the passageway.

4. In a bread toaster, a frame, means carried by said frame and forming a narrow vertical passageway open at its ends, said means including a way upon which the bread travels on edge, said way having a slot therein, an auxiliary frame, a feed mechanism carried by said auxiliary frame and including a feed bar having dogs thereon adapted to extend through the slot into said passageway and to engage the bread on said way, an electric motor carried by said auxiliary frame, a crank carried by said auxiliary frame and operated by said electric motor, said crank being connected to said feed bar and giving said feed bar a circular parallel movement, means for guiding said auxiliary frame for movement toward and from said first named frame to vary the distance of travel of the dogs within said passageway, and means for toasting the bread during its passage through the passageway.

5. In a bread toaster, a frame, means carried by said frame and forming a narrow vertical passageway open at its ends, said means including a way upon which the bread travels on edge, said way having a slot therein, an auxiliary frame, a feed mechanism carried by said frame and including a feed bar having dogs thereon adapted to extend through said slot and to engage the bread on said way, a crank carried by said auxiliary frame and engaging said feed bar at one locality to give said feed bar a circular movement, said feed bar being formed at one end with a circular guideway, and a guide carried by said auxiliary frame and engaging said guideway, said guide and guideway serving in conjunction with said crank to give the feed bar parallel movement, means for guiding said auxiliary frame for movement toward and from the first named frame, and means for toasting the bread during its passage through the passageway.

6. In a bread toaster, a frame, means carried by said frame and forming a narrow vertical passageway open at its ends, said means including a way upon which the bread travels on edge, said way having a slot therein, an auxiliary frame, a feed mechanism carried by said auxiliary frame and including a feed bar having dogs thereon adapted to extend through the slot and to engage the bread on said way, means carried by the auxiliary frame for giving the feed bar a circular parallel motion to cause the dogs to travel into the slot toward the bread, along the slot, away from the bread and back to original position beneath the slot, two spaced guides carried by said first named frame, lugs on said auxiliary frame slidable along said guides, said guides guiding said auxiliary frame for movement toward and from the first named frame, means for moving said auxiliary frame along said guides, and means for toasting the bread during its passage through the passageway.

7. In a bread toaster, a frame, means carried by said frame and forming a narrow vertical passageway open at its ends, said means including a way upon which the bread travels on edge, said way having a slot therein, an auxiliary frame, a feed mechanism carried by said frame and including a feed bar having dogs thereon adapted to extend through the slot and to engage the bread on said way, means carried by the auxiliary frame for giving the feed bar a circular parallel frame motion to cause the dogs to travel into the slot toward the bread, along the slot, away from the bread and back to original position beneath the slot, two spaced guides carried by said first named frame, lugs on said auxiliary frame slidable along said guides, said guides guiding said auxiliary frame for movement toward and from the first named frame, a shaft carried by said first named frame, a cam on said shaft engaging one of said lugs and operating to move said auxiliary frame along said guides in a direction toward and from said first named frame, and means for toasting the bread during its passage through the passageway.

8. In a bread toaster, means forming an elongated narrow vertical passageway open at its ends, adapted to receive at one end slices of bread on edge, means for progressing the bread through the passageway and for discharging it from the other end of the passageway, a heating element for toasting the bread during its passage through said passageway, said heating element being disposed remotely from one end of the passageway, and a heat conducting member of extended area disposed along said passageway in heat transmitting relation with respect to said heating element for distributing heat to the toast at a locality with respect to said passageway remote from said heating element.

9. In a bread toaster, means forming a passageway, said means including a way along which bread travels, a crank, a feed mechanism operated by said crank and including a dog, movable through said way into and out of said passageway, said crank and mechanism being movable toward and from said way, means for holding said crank and feed mechanism in adjusted position relative to said way, and means for toasting the bread in its passage through said passageway.

10. In a bread toaster, means forming a passageway, said means including a way along which bread travels, a feed mechanism including a dog movable through said way into and out of said passageway, said mechanism being movable toward and from said way, means for holding said feed mechanism in adjusted position relative to said way, and means for toasting the bread in its passage through said passageway.

11. In a bread toaster, means forming an elongated narrow vertical passageway open at its ends, adapted to receive at one end slices of bread on edge, means for progressing the bread through the passageway and for discharging it from the other end of the passageway, a heating element for toasting the bread during its passage through said passageway, said heating element being disposed remotely from one end of the passageway, and a heat conducting member coextensive in height with the bread disposed along said passageway in heat transmitting relation with respect to said heating element for transmitting heat to the toast at a locality with respect to said passageway remote from said heating element.

WILLIAM M. ANDERSON.